(12) United States Patent
Tai et al.

(10) Patent No.: US 8,745,984 B2
(45) Date of Patent: Jun. 10, 2014

(54) MULTI-STAGE SOLAR POWER DEVICE

(75) Inventors: Chang-Hsien Tai, Neipu Hsiang (TW);
Uzu-Kuei Hsu, Neipu Hsiang (TW);
Jr-Ming Miao, Neipu Hsiang (TW);
Liang-Ji Chang, Neipu Hsiang (TW)

(73) Assignee: National Pingtung University of Science & Technology, Neipu Hsiang (TW)

( * ) Notice: Subject to any disclaimer, the term of this patent is extended or adjusted under 35 U.S.C. 154(b) by 299 days.

(21) Appl. No.: 13/276,385

(22) Filed: Oct. 19, 2011

(65) Prior Publication Data
US 2012/0324887 A1 Dec. 27, 2012

(30) Foreign Application Priority Data
Jun. 23, 2011 (TW) .............................. 100122047 A

(51) Int. Cl.
*F03G 6/00* (2006.01)
(52) U.S. Cl.
USPC .................... 60/641.12; 60/641.14; 60/641.15
(58) Field of Classification Search
USPC ................................ 60/641.8, 641.11–641.15
See application file for complete search history.

(56) References Cited

U.S. PATENT DOCUMENTS

| 4,085,731 | A | * | 4/1978 | Weir | 126/634 |
| 4,286,581 | A | * | 9/1981 | Atkinson, Jr. | 126/585 |
| 4,490,981 | A | * | 1/1985 | Meckler | 60/641.15 |
| 5,123,247 | A | * | 6/1992 | Nelson | 60/641.8 |
| 7,798,684 | B2 | | 9/2010 | Boissevain | |
| 7,821,151 | B2 | | 10/2010 | Le et al. | |
| 2004/0233554 | A1 | * | 11/2004 | Kinoshita | 359/851 |

* cited by examiner

*Primary Examiner* — Hoang Nguyen
(74) *Attorney, Agent, or Firm* — Alan Kamrath; Kamrath IP Lawfirm, P.A.

(57) ABSTRACT

A multi-stage solar power device includes a light-permeable base plate, a plurality of light-condensing plates, a heat-conducting tube, at least one gas turbine, a gas inlet tube and a gas outlet tube. The light-condensing plates include a plurality of arcs with different length. The light-condensing plates are spaced from each other and arranged under the light-permeable base plate to define a plurality of light-reflecting chambers. The heat-conducting tube has first and second ends and extends through the light-reflecting chambers. At least one gas turbine is disposed in the heat-conducting tube. The gas inlet tube has first and second sections. The first section protrudes from the light-permeable base plate, and the second section extends through the light-permeable base plate. The gas outlet tube has one end protruding from the light-permeable base plate, as well as an other end extending through the light-permeable base plate.

12 Claims, 3 Drawing Sheets

MULTI-STAGE SOLAR POWER DEVICE

BACKGROUND OF THE INVENTION

1. Field of the Invention

The present invention generally relates to a multi-stage solar power device and, more particularly, to a multi-stage solar power device that uses solar power to drive a generator or other devices for electricity generation.

2. Description of the Related Art

In a conventional method to drive a gas turbine, a combustion chamber filled with an oil fuel is configured at a front section of the gas turbine. Then, the oil fuel in the combustion chamber is burned to generate a gas with high temperature/high pressure for driving blades of the gas turbine.

However, the above gas turbine driving method is performed on complex equipments and requires a great deal of electricity or fuel consumption. Particularly, when the gas turbine is connected to a generator for electricity generation, the gas turbine has to operate under a high temperature for a long period of time. As a result, a lot of energy is consumed and a significant amount of waste gas is generated, leading to environmental pollution.

SUMMARY OF THE INVENTION

It is therefore the primary objective of this invention to provide a multi-stage solar power device capable of collecting solar power for driving a gas turbine.

The invention discloses a multi-stage solar power device including a light-permeable base plate, a plurality of light-condensing plates, a heat-conducting tube, at least one gas turbine, a gas inlet tube and a gas outlet tube. The light-condensing plates include a plurality of arcs with different length in a radial cross section thereof. The light-condensing plates are spaced from each other and arranged under the light-permeable base plate in order according to the length thereof, so as to define a plurality of light-reflecting chambers. Each of the light-reflecting chambers is defined between adjacent two of the light-condensing plates. The heat-conducting tube has a first end and a second end and extends through the light-reflecting chambers. At least one gas turbine is disposed in the heat-conducting tube. The gas inlet tube has a first section and a second section. The first section protrudes from the light-permeable base plate, and the second section extends through the light-permeable base plate to connect with the second end of the heat-conducting tube. The gas outlet tube has one end protruding from the light-permeable base plate, as well as an other end extending through the light-permeable base plate to connect with the first end of the heat-conducting tube.

The first section of the gas inlet tube is disposed in the gas outlet tube and protrudes from the end of the gas outlet tube protruding from the light-permeable base plate.

The light-condensing plates are arranged in a coaxial manner to reflect light, which passes through the light-permeable base plate, to a same plane.

The first end of the heat-conducting tube is located in an uppermost one of the light-reflecting chambers to connect with the gas outlet tube, and the second end of the heat-conducting tube is located in a lowermost one of the light-reflecting chambers to connect with the gas inlet tube.

At least one gap is configured on each of the light-condensing plates excluding a lowermost one of the light-condensing plates. The second section of the gas inlet tube extends into a lowermost one of the light-reflecting chambers through the gaps along an axis of an uppermost one of the light-condensing plates.

Two sealing boards are provided under the light-permeable base plate. Each of the light-condensing plates has a first side and a second side. One of the two sealing board is coupled with the first sides of the light-condensing plates, and the other of the two sealing boards is coupled with the second sides of the light-condensing plates.

The light-reflecting chambers are filled with a heat-absorbing medium having a high absorption rate towards infrared rays.

The heat-conducting tube is made of or coated with an optical, thermal material.

The second section of the gas inlet tube is partially extended into the heat-conducting tube.

A compressor is provided on a top of the first section of the gas inlet tube, and the compressor is mounted with a rotatable low-temperature gas collector.

A fan is provided in the compressor, and the at least one gas turbine has a shaft connected to the fan.

A gas-out accelerator is provided on a top of the gas outlet tube. The gas-out accelerator forms a windward portion and an air-guiding portion on a top of the gas-out accelerator. The windward portion is higher than the air-guiding portion.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
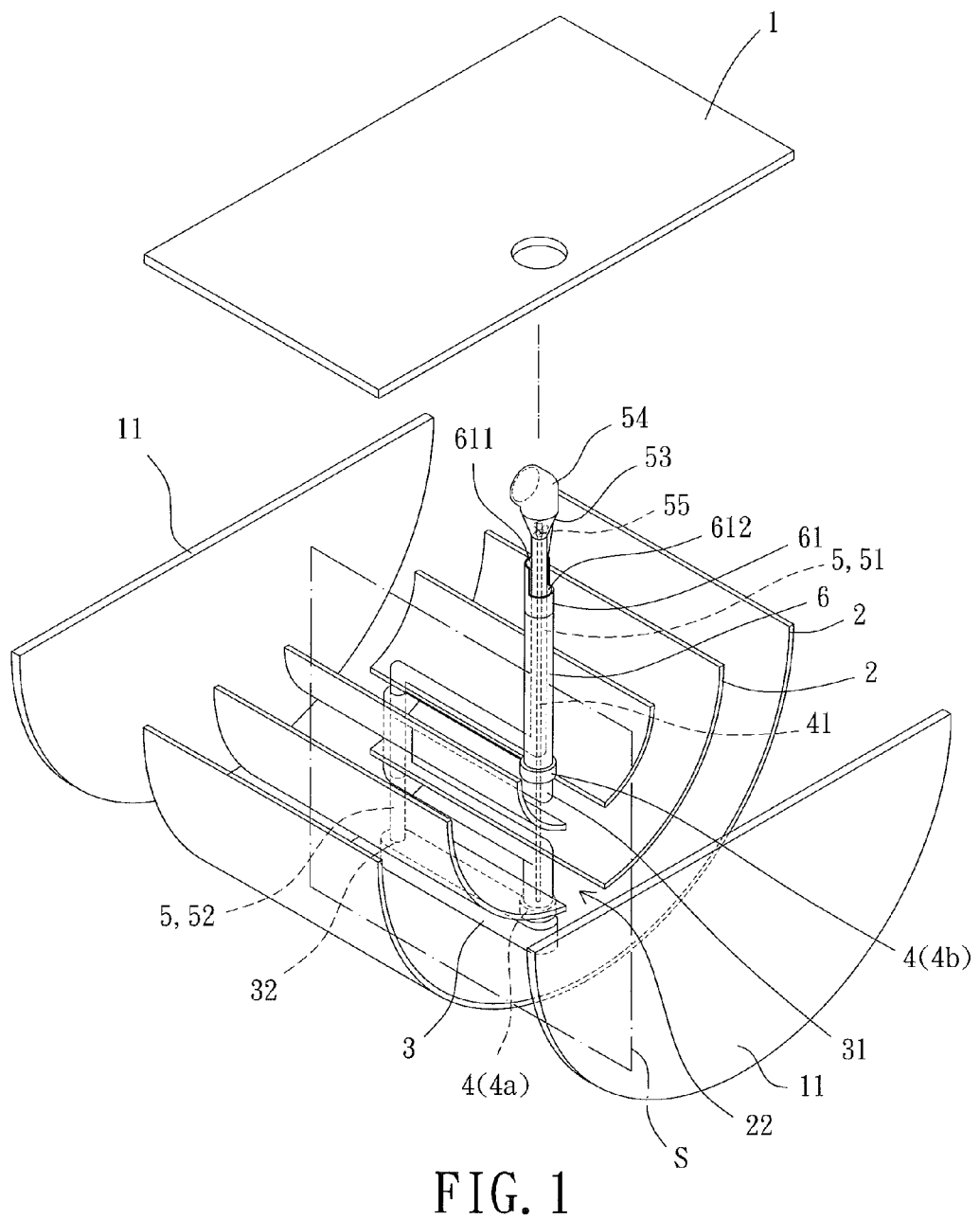
FIG. 1 is an exploded view of a multi-stage solar power device according to a preferred embodiment of the invention.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Referring to FIG. 1, an exploded view of a multi-stage solar power device is shown according to a preferred embodiment of the invention. The multi-stage solar power device includes a light-permeable base plate 1, a plurality of light-condensing plates 2, a heat-conducting tube 3, at least one gas turbine 4, a gas inlet tube 5 and a gas outlet tube 6. The heat-conducting tube 3 has two ends respectively connected to the gas inlet tube 5 and the gas outlet tube 6. The light-condensing plates 2 can provide the heat-conducting tube 3 with heat by reflecting sunlight, thereby heating a low temperature gas that enters the heat-conducting tube 3 from the gas inlet tube 5 and driving the at least one gas turbine 4 to produce mechanical work.

The light-permeable base plate 1 may be made of glass reinforced plastic and has high light permeability and high impact resistance, allowing the sunlight to pass therethrough and pass on.

Each light-condensing plate 2 has upper and lower surfaces that can reflect sunlight. The light-condensing plates 2 include a plurality of arcs with different length in a radial cross section thereof. The arcs are spaced from each other and arranged under the light-permeable base plate 1 in order according to the length thereof. The light-condensing plates 2 are arranged in a manner that the shorter the light-condensing plate 2 the closer to the light-permeable base plate 1 it is. In the embodiment, each light-condensing plate 2 has at least one arc-ending edge. The arc-ending edges of all light-condensing plates 2 can be securely fixed to a bottom face of the light-permeable base plate 1 to define a plurality of light-reflecting chambers 21. Preferably, the light-condensing plates 2 are arranged in a coaxial manner, such that the light-condensing plates 2 reflect sunlight to a same plane S when the sunlight comes down from the sky and passes through the light-permeable base plate 1. Apart from the lowermost light-condensing plate 2, at least one gap 22 may be configured on each light-condensing plate 21 for installation of the heat-conducting tube 3.

Two sealing boards 11 are provided under the light-permeable base plate 1 in order to keep heat inside the light-reflecting chambers 21. Each light-condensing plate 2 has a first side and a second side. One sealing board 11 is coupled with the first sides of the light-condensing plates 2 and the other sealing board 11 is coupled with the second sides of the light-condensing plates 2, thereby defining the light-reflecting chambers 21. The light-reflecting chambers 21 are preferably filled with a heat-absorbing medium such as Nitrogen oxide, with the heat-absorbing medium having a high absorption rate towards infrared rays to allow the sunlight to be reflected into the light-reflecting chambers 21 while keeping the heat inside the light-reflecting chambers 21 at the same time.

The heat-conducting tube 3 is made of or coated with an optical, thermal material to absorb the sunlight reflected by the light-condensing plates 2, leaving the heat-conducting tube 3 in a high temperature condition. The heat-conducting tube 3 has a first end 31 and a second end 32, with the first end 31 located in the uppermost light-reflecting chamber 21 and the second end 32 located in the lowermost light-reflecting chamber 21. The heat-conducting tube 3 is extended through the gaps 22 of the light-condensing plates 2 in an S-shaped path.

The at least one gas turbine 4 is disposed in the heat-conducting tube 3 and can be driven by heat of the heat-conducting tube 3. The at least one gas turbine 4 is provided to generate electricity or drive other devices.

The gas inlet tube 5 is provided to guide external low-temperature gas and has a first section 51 and a second section 52. The first section 51 protrudes from the light-permeable base plate 1 and is located outside the light-reflecting chambers 21. The second section 52 penetrates the light-permeable base plate 1 and extends into the lowermost light-reflecting chamber 21 through the gaps 22 along an axis of the uppermost light-condensing plate 2, thus finally connecting with the second end 32 of the heat-conducting tube 3. Preferably, the second section 52 of the gas inlet tube 5 is partially extended into the heat-conducting tube 3.

The gas outlet tube 6 has one end protruding from the light-permeable base plate 1, as well as the other end extending into the uppermost light-reflecting chamber 21 via the light-permeable base plate 1 to connect with the first end 31 of the heat-conducting tube 3. Therefore, the gas outlet tube 6 can expel the waste heat generated by the at least one gas turbine 4 to the outside. The first section 51 of the gas inlet tube 5 is preferably disposed in the gas outlet tube 6, so that the waste heat in the gas outlet tube 6 can increase the temperature of the low-temperature gas that flows down the gas inlet tube 5 to the light-reflecting chambers 21, increasing the operation efficiency of the at least one gas turbine 4. The gas inlet tube 5 and the gas outlet tube 6 can separate from each other in the uppermost light-reflecting chamber 21 to respectively connect with two ends of the heat-conducting tube 3.

In the embodiment, a funnel-like compressor 53 may be provided on a top of the first section 51 of the gas inlet tube 5 in order to facilitate circulation between the low-temperature gas and the high-temperature gas. The compressor 53 is connected with a rotatable low-temperature gas collector 54 that can be rotated by blowing wind to collect and guide low-temperature gas into the gas inlet tube 5.

A fan 55 may be further provided in the compressor 53. The at least one gas turbine 4 may include two gas turbines, with one of which having a shaft extending into the compressor 53 to connect with the fan 55. Thus, the gas turbine 4 can drive the fan 55 to operate, allowing a larger amount of low-temperature gas to be guided into the gas inlet tube 5.

Furthermore, a gas-out accelerator 61 may be provided on a top of the gas outlet tube 6, with the gas-out accelerator 61 forming a windward portion 611 and an air-guiding portion 612. The air-guiding portion 612 is lower than the windward portion 611 to form a height difference therebetween. The height difference allows a stack effect created at the air-guiding portion 612 to be reinforced when the wind blows from the windward portion 611 to the air-guiding portion 612 and drives the air at the air-guiding portion 612. Thus, air circulation is speeded and heat is expelled from the gas outlet tube 6 more rapidly.

Figure 2:
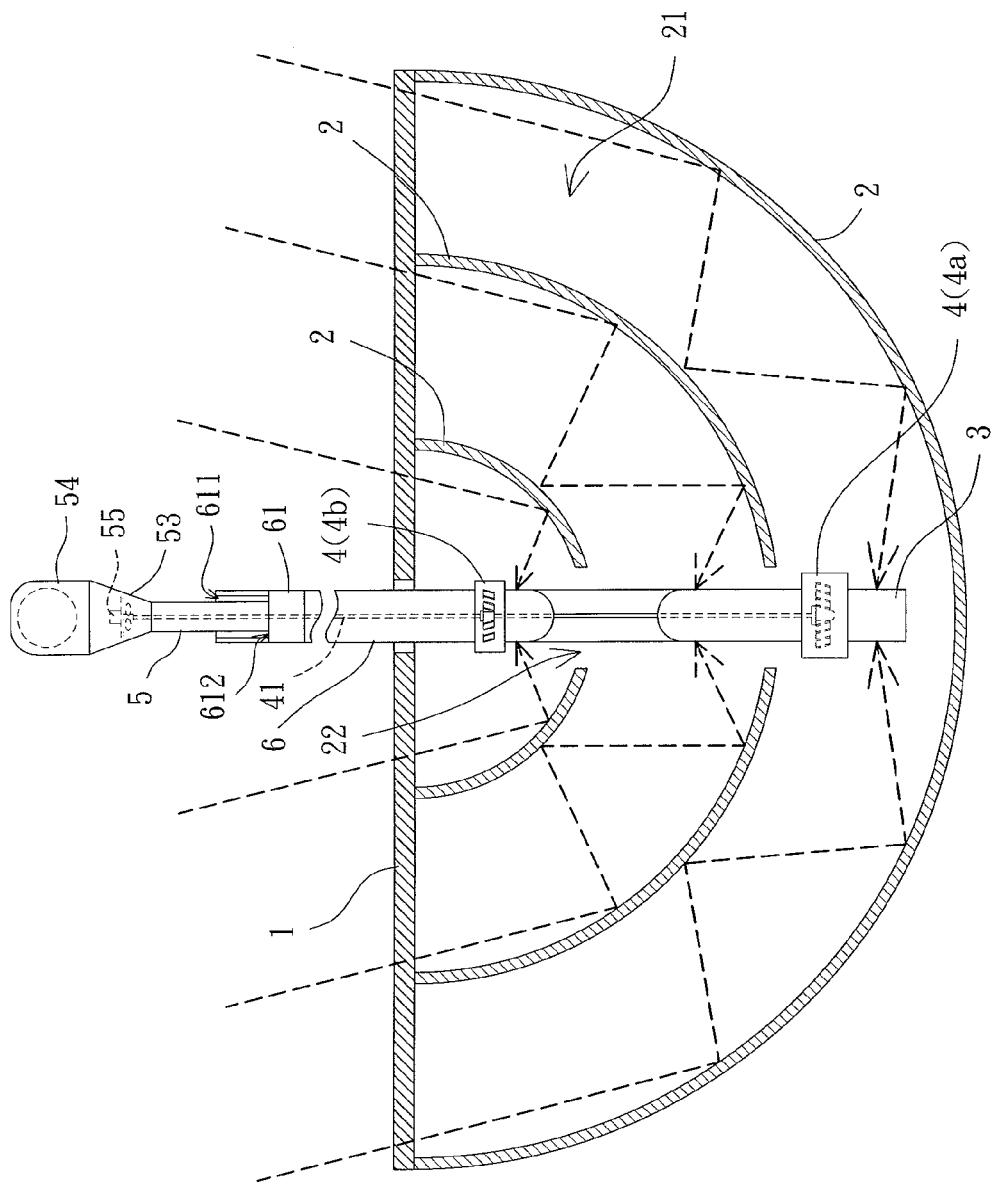
FIG. 2 shows light reflection of the multi-stage solar power device of the invention.

Referring to FIG. 2, an example of the multi-stage solar power device is shown, in which the multi-stage solar power device comprises three layers of light-condensing plates 2 and two gas turbines 4a and 4b respectively disposed in the lowermost and uppermost light-reflecting chambers 21. However, location and quantity of the light-condensing plates 2 and the at least one gas turbine 4 can be changed according to requirements.

In such an arrangement, the multi-stage solar power device can reflect the sunlight to the heat-conducting tube 3 when the sunlight comes down from the sky and passes through the light-permeable base plate 1, leaving the heat-conducting tube 3 in a high temperature condition. Each light-reflecting chamber 21 is filled with the heat-absorbing medium that has a high absorption rate towards infrared rays, allowing the sunlight to be reflected into the light-reflecting chambers 21 while keeping the heat inside the light-reflecting chambers 21 at the same time. Thus, heat loss of the heat-conducting tube 3 can be reduced for temperature maintenance of the heat-conducting tube 3.

Figure 3:
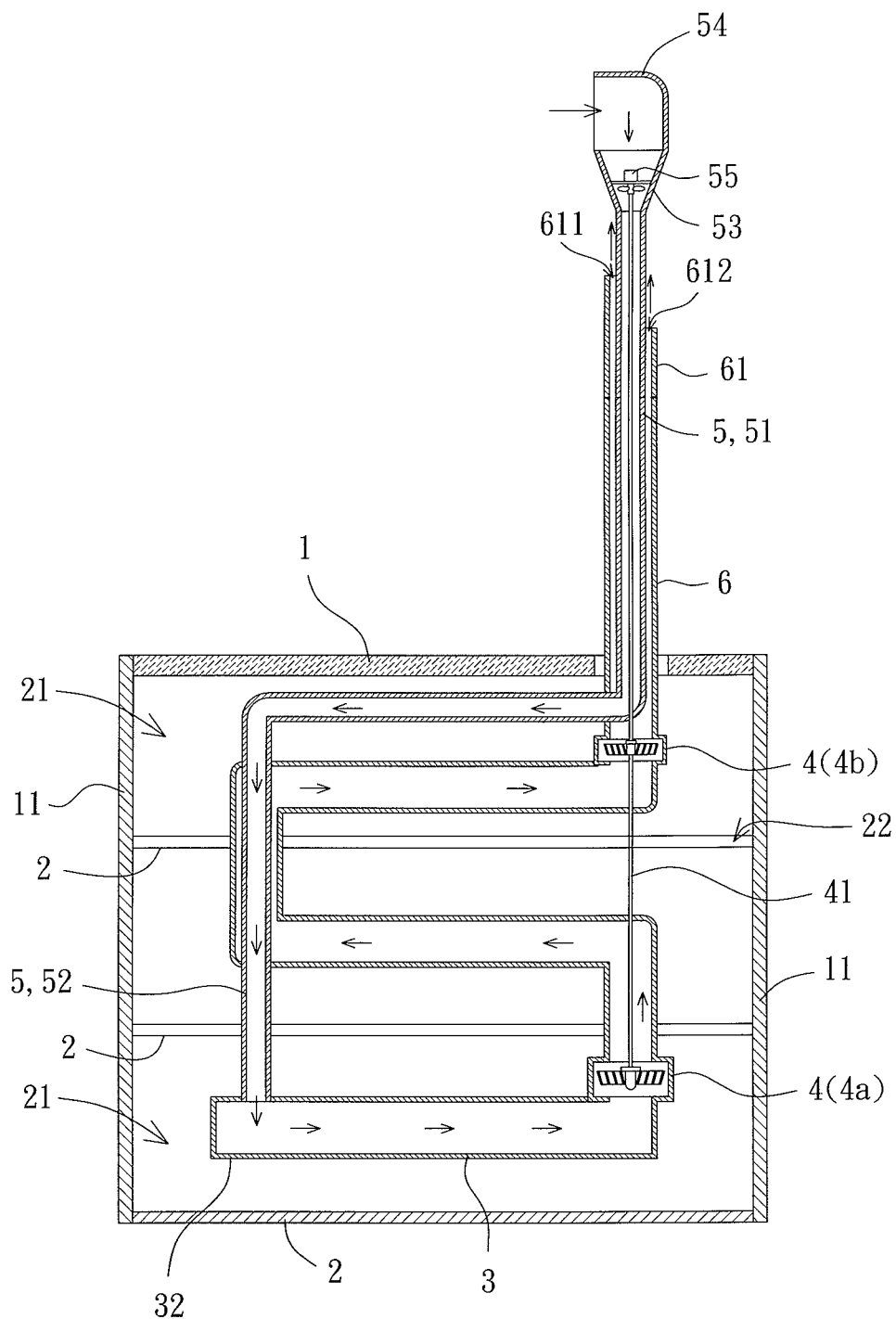
FIG. 3 shows a flow path of a gas in the multi-stage solar power device of the invention.

Referring to FIG. 3, when the low-temperature gas is guided into the gas inlet tube 5 by the low-temperature gas collector 54, the low-temperature gas enters the second section 52 below the light-permeable base plate 1 via the first section 51 of the gas inlet tube 5. The low-temperature gas is heated by the portion of the second section 52 that extends into the heat-conducting tube 3, and is rapidly heated in the heat-conducting tube 3 thereafter. The heated gas with high temperature can flow through the gas turbine 4a disposed in the lowermost light-reflecting chamber 21, driving the gas turbine 4a to operate. Since the gas turbine 4a has a shaft 41 provided to drive a generator (not shown) or to directly drive other devices (such as a compressor), energy loss resulting from energy conversion can be further reduced.

When the high-temperature gas passes through and drives the gas turbine 4a to operate, the high-temperature gas gives heat away. The gas that gives heat away may be heated again by the heat-conducting tube 3 when flowing from the gas turbine 4a to the gas turbine 4b disposed in the uppermost light-reflecting chamber 21, restoring the gas to high temperature. The gas with high temperature flows through the gas turbine 4b in the uppermost light-reflecting chamber 21, driving the gas turbine 4b to operate. Therefore, the shaft 41 of the gas turbine 4a drives the fan 55 in the compressor 53, causing a larger amount of low-temperature gas to be guided into the gas inlet tube 5. Meanwhile, waste heat generated by the gas turbine 4b is expelled via the gas outlet tube 6 connecting with the heat-conducting tube 3 while providing the gas inlet tube 5 with heat to increase the temperature of the gas flowing in the first section 51 of the gas inlet tube 5. Furthermore, the gas turbines 4a and 4b are connected by the same shaft 41 in the embodiment. Thus, when one of the gas turbines 4a and 4b has an insufficient rotational speed, the other gas turbine 4a or 4b is able to drive that gas turbine 4a or 4b to rotate faster. However, more than one shaft 41 can be arranged according to requirements.

In conclusion, the multi-stage solar power device of the invention may heat the low-temperature gas by reflecting sunlight, driving the at least one gas turbine 4 or other devices to generate mechanical work for electricity generation. Thus, the requirement of environmental protection is met.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A multi-stage solar power device, comprising:
   a light-permeable base plate;
   a plurality of light-condensing plates including a plurality of arcs with different length in a radial cross section thereof, wherein the light-condensing plates are spaced from each other and arranged under the light-permeable base plate in order according to the length thereof, so as to define a plurality of light-reflecting chambers, and each of the light-reflecting chambers is defined between adjacent two of the light-condensing plates;
   a heat-conducting tube having a first end and a second end and extending through the light-reflecting chambers;
   at least one gas turbine disposed in the heat-conducting tube;
   a gas inlet tube having a first section and a second section, wherein the first section protrudes from the light-permeable base plate, and the second section extends through the light-permeable base plate to connect with the second end of the heat-conducting tube; and
   a gas outlet tube having one end protruding from the light-permeable base plate, as well as an other end of the gas outlet tube extending through the light-permeable base plate to connect with the first end of the heat-conducting tube.

2. The multi-stage solar power device as claimed in claim 1, wherein the first section of the gas inlet tube is disposed in the gas outlet tube and protrudes from the end of the gas outlet tube protruding from the light-permeable base plate.

3. The multi-stage solar power device as claimed in claim 1, wherein the light-condensing plates are arranged in a coaxial manner to reflect light, which passes through the light-permeable base plate, to a same plane.

4. The multi-stage solar power device as claimed in claim 1, wherein the first end of the heat-conducting tube is located in an uppermost one of the light-reflecting chambers to connect with the gas outlet tube, and the second end of the heat-conducting tube is located in a lowermost one of the light-reflecting chambers to connect with the gas inlet tube.

5. The multi-stage solar power device as claimed in claim 1, wherein at least one gap is configured on each of the light-condensing plates excluding a lowermost one of the light-condensing plates, the second section of the gas inlet tube extends into a lowermost one of the light-reflecting chambers through the gaps along an axis of an uppermost one of the light-condensing plates.

6. The multi-stage solar power device as claimed in claim 1, wherein two sealing boards are provided under the light-permeable base plate, each of the light-condensing plates has a first side and a second side, one of the two sealing board is coupled with the first sides of the light-condensing plates, and the other of the two sealing boards is coupled with the second sides of the light-condensing plates.

7. The multi-stage solar power device as claimed in claim 6, wherein the light-reflecting chambers are filled with a heat-absorbing medium having a high absorption rate towards infrared rays.

8. The multi-stage solar power device as claimed in claim 1, wherein the heat-conducting tube is made of or coated with an optical, thermal material.

9. The multi-stage solar power device as claimed in claim 1, wherein the second section of the gas inlet tube is partially extended into the heat-conducting tube.

10. The multi-stage solar power device as claimed in claim 1, wherein a compressor is provided on a top of the first section of the gas inlet tube, and the compressor is mounted with a rotatable low-temperature gas collector.

11. The multi-stage solar power device as claimed in claim 10, wherein a fan is provided in the compressor, and the at least one gas turbine has a shaft connected to the fan.

12. The multi-stage solar power device as claimed in claim 1, wherein a gas-out accelerator is provided on a top of the gas outlet tube, the gas-out accelerator forms a windward portion and an air-guiding portion on a top of the gas-out accelerator, and the windward portion is higher than the air-guiding portion.

* * * * *